May 1, 1928. 1,668,390
J. W. AUMAN
METHOD OF AND APPARATUS FOR FORMING TIRE AND THE LIKE TUBES
Filed May 17, 1926
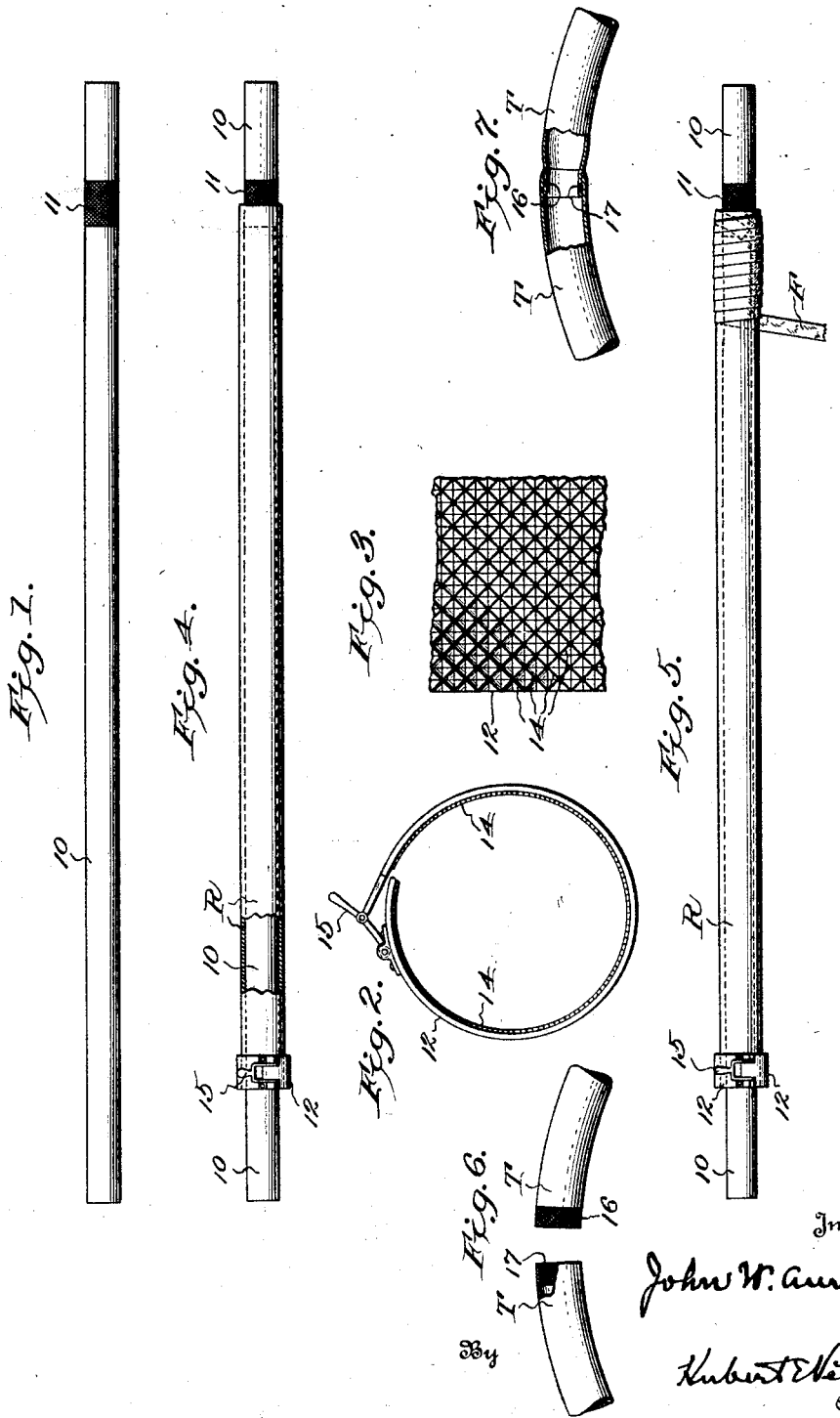

Patented May 1, 1928.

1,668,390

UNITED STATES PATENT OFFICE.

JOHN W. AUMAN, OF RACINE, WISCONSIN.

METHOD OF AND APPARATUS FOR FORMING TIRE AND THE LIKE TUBES.

Application filed May 17, 1926. Serial No. 109,750.

This invention relates to certain improvements in the method of and apparatus for forming tire and the like tubes; and the nature and objects of the invention will be readily recognized and understood by those skilled in the art involved in the light of the following explanation and detailed description of the accompanying drawings illustrating what I at present consider to be the preferred expressions and embodiments of the invention from among others of which the invention is capable within the spirit and the scope thereof.

In certain methods of manufacturing tire tubes, the tubes are formed on a cylindrical or tubular mandrel, generally referred to as a tube "pole" in the art, by winding a sheet of unvulcanized rubber around and onto the mandrel, and then securing the rubber sheet in tube forming position thereon by winding or wrapping a band or strip of fabric spirally therearound and thereover with the convolutions of the fabric band overlapping, after which the mandrel or pole carrying the rubber sheet so secured thereon, is vulcanized to produce a length of vulcanized cured tube. The vulcanized tube is removed by unwinding the fabric band wrapping and then stripping the tube from the mandrel. The tube thus formed is next prepared for splicing or joining the ends thereof together to complete the endless, annular tire or inner tube, by roughing the opposite ends thereof, one end on the inside and the opposite end on the outside, for a distance to cover the overlapped end portions of the tube in the splice. The end of the tube roughened on the outside is then inserted in the end roughened or the inside, a suitable cement or other medium having been previously applied to the roughened tube ends, and the overlapped tube ends are then vulcanized or otherwise suitably secured together to form the splice and provide the endless annular tire tube, in accordance with any of the usual methods familiar in this art for splicing or vulcanizing the ends of tire or other tubes together.

Generally, the operation of roughing or treating the ends of the tube after vulcanization or curing, is carried out by means of a suitable buffing wheel or wire scratch brush, and forms a distinct and separate step, usually performed by hand, in the methods of tube manufacture as above outlined, which step consumes time, lowers production while increasing the cost thereof, as well as rendering uniformity and efficiency in the tube splices or joints produced therewith difficult of attainment, due to improper or incomplete roughing or treatment of the tube ends, as is well recognized and familiar in the art.

The present invention is directed to the elimination of this step of roughing or otherwise preparing the end or ends of tire tubes for splicing or joining, after the tubes are cured or vulcanized and removed from the tube mandrel, by the provision of a method of forming tire tubes in which an end or the ends of a tube are roughened or prepared for splicing during the operation of vulcanizing or curing the tube on the mandrel or pole, so that the tube ends are prepared for splicing or joining upon stripping or removal of the vulcanized tube from the mandrel.

Another object of the invention is to provide a method of forming tire tubes in which the step of roughing or preparing the tube ends for splicing after curing and removal of the tube from the mandrel, is eliminated, by preparing the tube ends for splicing during the wrapping and vulcanizing operation of the tube on the mandrel, and while the rubber is in a plastic, readily moldable state.

Another object of the invention is to provide a method of forming tire tubes in which the tube ends are roughened or prepared for splicing by molding the same on the mandrel or tube pole with the tube rubber in a plastic state and during the vulcanizing of the tube, so as to eliminate preparation of the tube ends after vulcanization and removal of the tube from the mandrel, and to produce uniformity in the preparation of the tube ends and thereby reduce the number of defective splices, while increasing production and reducing the cost thereof.

A further object of the invention is the provision of simple and efficient apparatus for carrying out the method of the present invention, and to so design and arrange such apparatus that it will not only prepare the tube ends for splicing during and by the vulcanization of the tube, but will further function to assist in wrapping or binding the sheet rubber in tube forming position on the mandrel or pole.

With the foregoing general objects and certain other objects in view, which other objects will be readily apparent to those skilled in the art from the following explanation, the invention consists in certain novel steps in the method of tire tube manufacture, and in certain novel features in construction and in arrangements of the elements of apparatus therefor, as will be more fully and particularly referred to and specified hereinafter.

Referring to the accompanying drawings:

Fig. 1, is a view in elevation of a tube mandrel or pole constructed in accordance with the invention.

Fig. 2, is a view in elevation of the tube end clamp of the invention for binding the tube to the pole and molding the end of the tube on the outside thereof into roughened or knurled form.

Fig. 3, is a fragmentary view in elevation of the knurled or roughened molding surface of the tube end clamp.

Fig. 4, is a view in elevation showing a sheet of rubber wound onto the mandrel to form the tube and clamped at one end by the end clamp of the invention.

Fig. 5, is a view in elevation similar to Fig. 4, with the wrapping applied to the tube and the tube prepared for vulcanizing.

Fig. 6, is a view in elevation of the vulcanized tire tube stripped from the mandrel with the ends knurled or roughened, one on the inside the other on the outside, for splicing.

Fig. 7, is a view in elevation of the prepared tube ends in spliced position to form the completed tire tube.

In accordance with the present invention, a tube mandrel or pole 10 of the usual or any other desired general type adapted for use in the manufacture of tire tubes, is formed adjacent one end thereof with a portion of the outer surface knurled or otherwise suitably roughened, to form a knurled molding band 11 completely around the mandrel. The width and the location of the knurled mandrel encircling surface or band 11 on the mandrel, is such that when the sheet of unvulcanized rubber is wound into tube forming position on the mandrel, one end of the tube overlaps this roughened or knurled portion with the inner surface of the tube bearing thereagainst. The extent of overlap of the tube end onto the roughened or knurled portion 11 of the mandrel is approximately equal to the lap of the splice desired when the vulcanized tube ends are joined or spliced to complete the tube, and the purpose of the tube end overlapping onto surface 11 is to form the desired roughened inner end surface of the tube for the splicing operation, as will be explained more fully hereinafter.

A clamp 12 is provided, (see Figs. 2 and 3) for fitting over and around the end of a tube on mandrel 10 opposite that overlapping mandrel band 11, for the purpose of preparing the outer surface of the tube end for splicing, as by forming a roughened or knurled outer end surface therearound, as well as for the purpose of clamping and securing the end of the tube formed by winding the sheet rubber on the mandrel, in position for vulcanizing. The clamp 12 embodies a split ring or band of a suitable spring or resilient material, such for example as steel or brass, having its inner surface 14 roughened or knurled completely therearound, as will be clear by reference to Fig. 3 in particular. The open or split ends of the ring or band of clamp 12 are, in the example hereof connected together by a lever type of closure or lock 15 for drawing the ends of the band together to clamp and lock the band in clamping position, or for releasing the clamp 12 by spreading the ends thereof to permit of its removal from clamping position. Any suitable or desired means may be provided for securing the clamp in operative position and for releasing the same, as will be readily apparent. The band forming clamp 12 is of a width to fit over and overlap the end of a tube a distance to form the required width of roughened tube end for the splice with the tube ends joined.

In carrying out the method of the invention with the apparatus therefor, as above described, a sheet of unvulcanized rubber R is rolled or wound onto the mandrel 10 into tube forming position with one end thereof overlapping the knurled band 11 formed around the mandrel. A clamp 12 is then fitted over the mandrel and clamped onto and around the opposite end of the sheet rubber R with the knurled surface of the clamp bearing against and around the outer surface of the end of the tube so formed, as well as clamping the end of the tube tightly against the mandrel to secure the rubber thereon and prevent passage of air or steam between the end of the tube and the mandrel. The foregoing position of the wound sheet rubber R and tube end clamp 12, is shown in Fig. 4 of the drawings. After the application of end clamp 12, a strip or band of fabric F is then spirally wrapped over the opposite end of the wound rubber sheet R forming the tube which overlaps knurled band 11 of the mandrel, and this spiral wrapping of fabric F is continued inwardly over and covering the unvulcanized tube to bind and secure the same in position on the mandrel 10, as will be readily understood by those familiar with this art upon reference to Fig. 5 of the drawings.

The tube formed by the rubber sheet R wound on mandrel 10 and secured thereon in tube forming position by clamp 12 and wrapped fabric F, is placed in any suitable vulcanizer and is cured to produce the vulcanized tube. As the rubber sheet R is unvulcanized and in a plastic and readily moldable or workable state before vulcanization, the inner surface of the end overlapping the knurled band 11 around mandrel 10, and the outer surface of the end around which clamp 12 is secured with the surface 14 thereof in contact therewith, are molded or pressed by these knurled surfaces which are forced thereagainst under pressure, and during vulcanization or curing of the tube on the mandrel the opposite ends of the tube are formed with the roughened or knurled surfaces, on the inner surface of the tube at one end and on and around the outer surface of the tube at the opposite end.

After vulcanization on mandrel 10, the fabric wrapping F and the end clamp 12 are removed, and the vulcanized tube T so formed, is stripped from the mandrel or pole in the usual or any other manner desired. The stripping operation reverses the inner and outer surfaces of the tube on the mandrel, so that on the stripped tube T, the roughened or knurled surface 16 formed by the mandrel knurling 11 is around the outer surface of one end of the tube, and the roughened surface 17 formed by the clamp 12 is around the inner surface of the opposite end of the tube. A suitable cement or the like can then be applied to the roughened or knurled end surfaces 16 and 17, and the ends of the tube T brought together with the end of the tube having the inner knurled surface 17 fitting over and lapping the end having the outer knurled surface 16, to form the tube splice, which is then vulcanized or otherwise suitably treated to secure and join the ends of the tube together to form and complete the endless tire tube, as clearly shown by Fig. 7 of the accompanying drawings.

Thus, the vulcanized tube T when stripped from the mandrel has its ends prepared for splicing or joining without further operations thereon, and the step of preparing the tube ends for splicing after vulcanization and stripping from the mandrel is eliminated. If desired or found expedient but one end of the tube need be roughened or prepared for splicing. The apparatus for carrying out the method, and particularly the tube end clamp 12, reduces the operation of wrapping the unvulcanized tube with fabric F over both ends and further reduces the time and labor involved in the formation of a tube.

In the foregoing description and explanation of the invention, and in the accompanying drawings, a method of forming tire tubes embodying the steps of the method of the invention, is presented in which the uncured tubes is formed on the curing mandrel by winding a sheet of unvulcanized rubber thereon. However, the invention is not in any manner limited or restricted to the manner of forming or placing the unvulcanized tube on a mandrel, as the tube can be formed in a tubing machine and then slipped onto the mandrel, or blown onto the mandrel by compressed air, or in any other desired manner, without going beyond the limits of the invention. Further, the invention is not limited to any particular means or method for obtaining pressures on the tubes during vulcanization, and the use of fabric wrapping as described and disclosed herein is purely by way of example for purposes of explanation and not by way of limitation.

While the method and apparatus of the invention is particularly adapted for the formation of tire tubes, it is of general application to the formation of other tubing for other purposes. The disclosure herein of the straight, "pole" type of mandrel is not by way of limitation as the invention is also capable of use in forming tubes on curved or other forms of mandrels, as will be understood by those familiar with the art.

The terms "roughened" or "knurled" as they are used herein and in the appended claims are to be interpreted in a generic sense to include any formation of the tube ends in preparation for joining and splicing the same.

It is also evident that various changes, variations, and modifications might be resorted to, and hence I do not wish to limit myself to the exact disclosures hereof.

Desiring to protect my invention in the broadest manner legally possible, what I claim is:

1. In a method of forming tubes, those steps which consist in preparing the outer surface at one end of the tube and the inner surface at the opposite end of the tube during vulcanization to provide roughened contact surfaces, for splicing after vulcanization with the prepared ends overlapped.

2. In a method of forming tubes, those steps which consist in forming a tube of unvulcanized rubber on a mandrel with one end thereof overlapping a roughened surface around the mandrel, applying a band having a roughened inner surface around the opposite end of the tube, applying pressure to the tube at the end overlapping the roughened mandrel surface, and then vulcanizing the tube to provide a vulcanized tube having the ends roughened for overlapping and splicing.

3. In apparatus for forming tire tubes, a tube mandrel having a knurled band therearound for overlapping by the end of an unvulcanized tube formed on the mandrel.

4. In apparatus for forming tire tubes, in combination, a tube mandrel having a knurled surface therearound for overlapping by an end of an unvulcanized tube formed on the mandrel, and a band having a knurled inner surface for clamping around the opposite end of the unvulcanized tube on said mandrel.

5. As a new article of manufacture, a tire tube formed with a knurled surface around the inner side of one end thereof, and a knurled surface around the outer side of the opposite end thereof.

Signed at Racine, Racine County, Wisconsin, this 12th day of May, 1926.

JOHN W. AUMAN.